United States Patent

Yoshimura et al.

Patent Number: 6,124,651
Date of Patent: Sep. 26, 2000

[54] METHOD FOR DRIVING STEPPING MOTOR OF MULTIPHASE HYBRID TYPE

[75] Inventors: Noriyuki Yoshimura; Kenji Yoshida, both of Kitasaku-gun, Japan

[73] Assignee: Minebea Co., Ltd., Nagano, Japan

[*] Notice: This patent is subject to a terminal disclaimer.

[21] Appl. No.: 08/313,129

[22] PCT Filed: Feb. 1, 1994

[86] PCT No.: PCT/JP94/00141

§ 371 Date: Nov. 22, 1994

§ 102(e) Date: Nov. 22, 1994

[87] PCT Pub. No.: WO94/18745

PCT Pub. Date: Aug. 18, 1994

Related U.S. Application Data

[63] Continuation-in-part of application No. 08/099,539, Jul. 30, 1993, Pat. No. 5,374,865.

[30] Foreign Application Priority Data

Feb. 1, 1993 [JP] Japan ................................ 5-036059

[51] Int. Cl.⁷ .......................... H02K 37/04; H02K 37/02
[52] U.S. Cl. .................................. 310/49 R; 318/696
[58] Field of Search .......................... 310/49 R, 154, 310/254; 318/696

[56] References Cited

U.S. PATENT DOCUMENTS

| | | | |
|---|---|---|---|
| 3,866,104 | 2/1975 | Heine | 318/696 |
| 4,000,452 | 12/1976 | Heine | 318/696 |
| 4,385,247 | 5/1983 | Satomi | 310/49 R |
| 5,315,192 | 5/1994 | Satomi | 310/49 R |
| 5,374,865 | 12/1994 | Yoshimura et al. | 310/49 R |
| 5,444,316 | 8/1995 | Ohya et al. | 310/49 R |

FOREIGN PATENT DOCUMENTS

| | | | |
|---|---|---|---|
| 23 42 994 | 3/1975 | Germany . | |
| 93-289462 | 5/1993 | Japan | 31/49 R |

*Primary Examiner*—Nestor Ramirez
*Assistant Examiner*—Karl Tamai
*Attorney, Agent, or Firm*—Staas & Halsey LLP

[57] ABSTRACT

A multi-phase hybrid type stepping motor includes a rotor which is rotatably mounted on a rotary shaft. A rotor magnet is mounted to an axial center of the rotor and two rotor caps are mounted to both sides of the rotor magnet respectively. Each of said rotor caps has a plurality of rotor teeth of predetermined pitch disposed about a perimeter thereof. A stator encircles said rotor cap and includes a first plurality of magnetic poles and a second plurality of magnetic poles alternately disposed between said first plurality of magnetic poles. The first plurality of magnetic poles includes a first predetermined number of teeth disposed on an inward end thereof while the second plurality of magnetic poles has a second predetermined number of teeth disposed on an inward end thereof. The first and second predetermined number of teeth have the same pitch as the rotor teeth. Each of said second plurality of magnetic poles includes a second predetermined number of teeth greater than said first predetermined number of teeth.

14 Claims, 7 Drawing Sheets

| STEP \ POLE | 1 | 2 | 3 | 4 | 5 | 6 | 7 | 8 | 9 | 10 |
|---|---|---|---|---|---|---|---|---|---|---|
| 1 | — | S | — | N | S | — | N | — | S | N |
| 2 | N | S | — | N | — | S | N | — | S | — |
| 3 | N | — | S | N | — | S | — | N | S | — |
| 4 | N | — | S | — | N | S | — | N | — | S |
| 5 | — | N | S | — | N | — | S | N | — | S |
| 6 | — | N | — | S | N | — | S | — | N | S |
| 7 | S | N | — | S | — | N | S | — | N | S |
| 8 | S | — | N | S | — | N | — | S | N | — |
| 9 | S | — | N | — | S | N | — | S | — | N |
| 10 | — | S | N | — | S | — | N | S | — | N |

FIG. 6

| STEP \ POLE | 1 | 2 | 3 | 4 | 5 | 6 | 7 | 8 | 9 | 10 |
|---|---|---|---|---|---|---|---|---|---|---|
| 1  | — | S | N | N | S | — | N | S | S | N |
| 2  | — | S | — | N | S | — | N | — | S | N |
| 3  | N | S | — | N | S | S | N | — | S | N |
| 4  | N | S | — | N | — | S | N | — | S | — |
| 5  | N | S | S | N | — | S | N | N | S | — |
| 6  | N | — | S | N | — | S | — | N | S | — |
| 7  | N | — | S | N | N | S | — | N | S | S |
| 8  | N | — | S | — | N | S | — | N | — | S |
| 9  | N | N | S | — | N | S | S | N | — | S |
| 10 | — | N | S | — | N | — | S | N | — | S |
| 11 | — | N | S | S | N | — | S | N | N | S |
| 12 | — | N | — | S | N | — | S | — | N | S |
| 13 | S | N | — | S | N | N | S | — | N | S |
| 14 | S | N | — | S | — | N | S | — | N | S |
| 15 | S | N | N | S | — | N | S | S | N | — |
| 16 | S | — | N | S | — | N | — | S | N | — |
| 17 | S | — | N | S | S | N | — | S | N | N |
| 18 | S | — | N | — | S | N | — | S | — | N |
| 19 | S | S | N | — | S | N | N | S | — | N |
| 20 | — | S | N | — | S | — | N | S | — | N |

FIG. 7

METHOD FOR DRIVING STEPPING MOTOR OF MULTIPHASE HYBRID TYPE

The present invention is a continuation in part of application Ser. No. 08/099,539, filed Jul. 30, 1993, now U.S. Pat. No. 5,374,865.

BACKGROUND OF THE INVENTION

1. Field of the Invention

The present invention relates to an improved method of driving a 5-phase hybrid stepping motor.

2. Description of Related Art

Hybrid stepping motors have been well known for over a quarter of a century as actuators appropriated for highly accurate positioning movements. The hybrid stepping motors are widely used in various machine tools, e.g. with fully automated production lines, as well as computer related instruments including printers, plotters, facsimile machines, and disk drive units.

For increasing the versatility of use, there is made an attempt to minimize the step angle of such a hybrid stepping motor. To this respect, four- and five-phase types of stepping motors are now commonly provided.

The conventional four- or five-phase stepping motors however have some disadvantages in that torque stiffness is unstable, static torque is varied depending on the stop position, and the step angle does not provide high accuracy. It is an object of the present invention to eliminate the foregoing disadvantages.

SUMMARY OF THE INVENTION

For achievement of the above object, a method of driving a multi-phase hybrid type stepping motor which has a NS=K(S0–S1)+10(S1–1+B) where K is an integer from 2 to 5, S0 and S1 are smallest possible integers or may be equal, and B is a fraction of 1 so that 10B (ten times of B) is always an integer, the ten stator windings on their respective fixed magnetic poles being coupled to one another in a circular order of P3, P8, P6, P1, P9, P4, P2, P7, P5, and P10, five terminals disposed between P10 and P3, P8 and P6, P1 and P9, P4 and P2, and P7 and P5 respectively, and by magnetization of the ten windings at each step of the rotating movement, N and S poles of the same number being generated.

BRIEF DESCRIPTION OF THE DRAWINGS

FIG. 6 is a chart showing the magnetic shift at fixed magnetic poles in full-step mode; and FIG. 7 is a chart showing the magnetic shift at the fixed magnetic poles in half-step mode.

THE PREFERRED EMBODIMENTS OF THE PRESENT INVENTION

Preferred embodiments of the present invention will be described in more detail while referring to the accompanying drawings.

Figure 1:
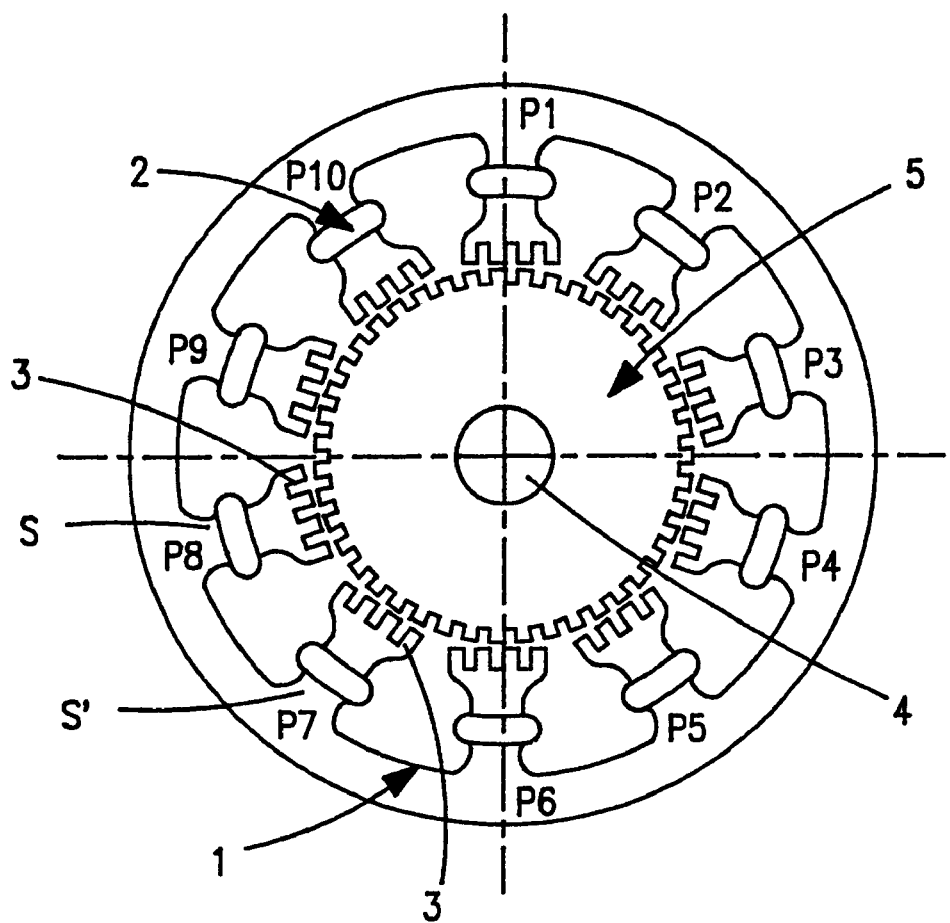
FIG. 1 is a cross sectional view showing one embodiment of the present invention.
Figure 2:
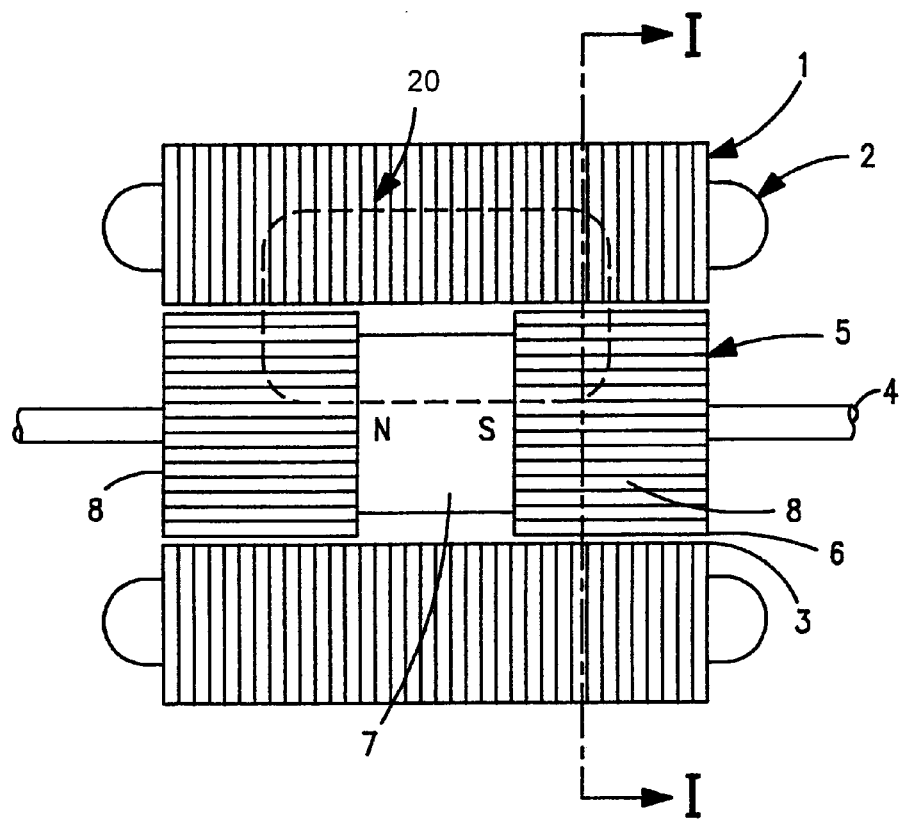
FIG. 2 is a longitudinal sectional view of the embodiment of FIG. 1 of the present invention.

FIGS. 1 and 2 illustrate in cross section a stepping motor according to the present invention. FIG. 1 is a cross sectional view of FIG. 2 taken along the line extending at a right angle to a rotary shaft 4. As shown, a stator 1 has ten fixed magnetic poles S, S' arranged inwardly thereof. Each of the fixed magnetic poles S or S' has a stator coil 2 wound thereon and is provided at an inward end with a set of small teeth 3. It is assumed that the total number of the small teeth 3 is NS. The rotary shaft 4 has a rotor 5 mounted about a center thereto. The rotor 5 has a permanent magnet 7 mounted to the axial center thereof and two rotor caps 8 fitted to both sides of the magnet 7 respectively, as best shown in FIG. 2. The rotor caps 8 have a plurality of teeth 6 provided on the circumferential surface thereof. It is now assumed that the total number of the teeth 6 is NR. FIG. 1 is a cross sectional view taken along the line I—I of FIG. 2. The ten stator coils 2 are numbered from P1 to P10. Magnetic bundle passage 20 is illustrated by a dashed line.

Figure 3:
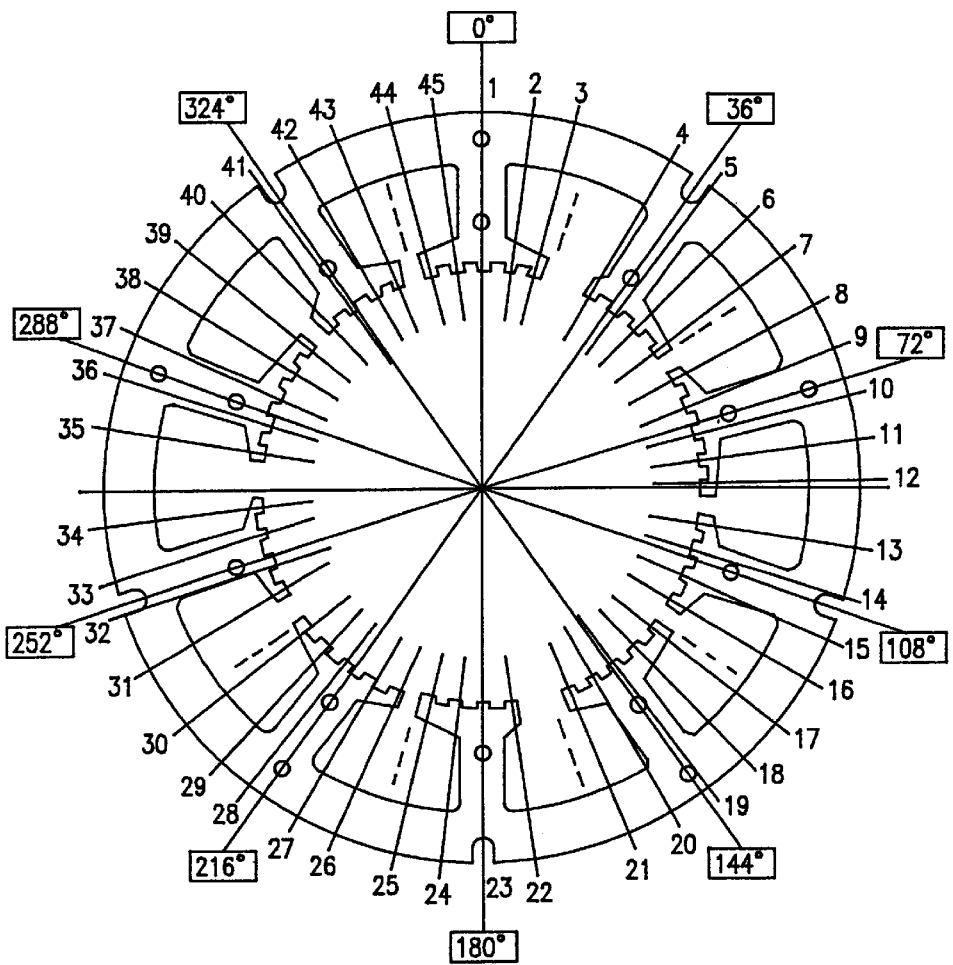
FIG. 3 is a front view of a stator system according to another embodiment of the present invention.

A first embodiment of the present invention is intended to have a five-phase stepping motor with the ten fixed magnetic poles S, S' improved in torque stiffness, step angle precision, and efficiency of movement when NR=50 (where a shift angle between two adjacent fixed magnetic poles is ⅕Tp, Tp being a pitch of the small teeth 3). In particular, the number of the small teeth 3 of each alternate one of the ten fixed magnetic poles is increased by one while that of the other fixed magnetic poles is kept to 4 teeth (forming an asymmetrical fixed magnetic pole arrangement of the stator). Accordingly, the 4-teeth fixed magnetic poles S are disposed opposite to the 5-teeth fixed magnetic poles S' (FIG. 3). The structure of the asymmetric stator illustrated in FIG. 3 has a shift angle of 1/5 Tp., Nr=50, and Ns=45, with a small slot having three intervals and a small slot having seven intervals.

The difference of the teeth between the rotor 5 and the fixed magnetic poles S,S' is 5 (as calculated by subtracting 4×5 from 50 and then, 5×5 from the result).

This embodiment also offers an improvement in the stability at a torque equilibrium position. The reason is that while at least two adjacent fixed magnetic poles are polarized to N, other two adjacent fixed magnetic poles are turned to S (FIG. 6).

As compared with the first embodiment in which the improvement in the four different respects is ensured with the rotor having 40, 50, 80, 90, or 100 teeth, using such an asymmetrical arrangement of the ten fixed magnetic poles of the stator, a second embodiment is characterized by the shift angle between two adjacent fixed magnetic poles which is equal to 3/10 Tp or 7/10 Tp. Equally, the number of the small teeth 3 of every alternate one of the fixed magnetic poles is increased by one.

For determining an optimum degree of the step angle for performance of a stepping motor, the difference of teeth between the rotor and the stator is preferably 5 or 3.

Figure 4:
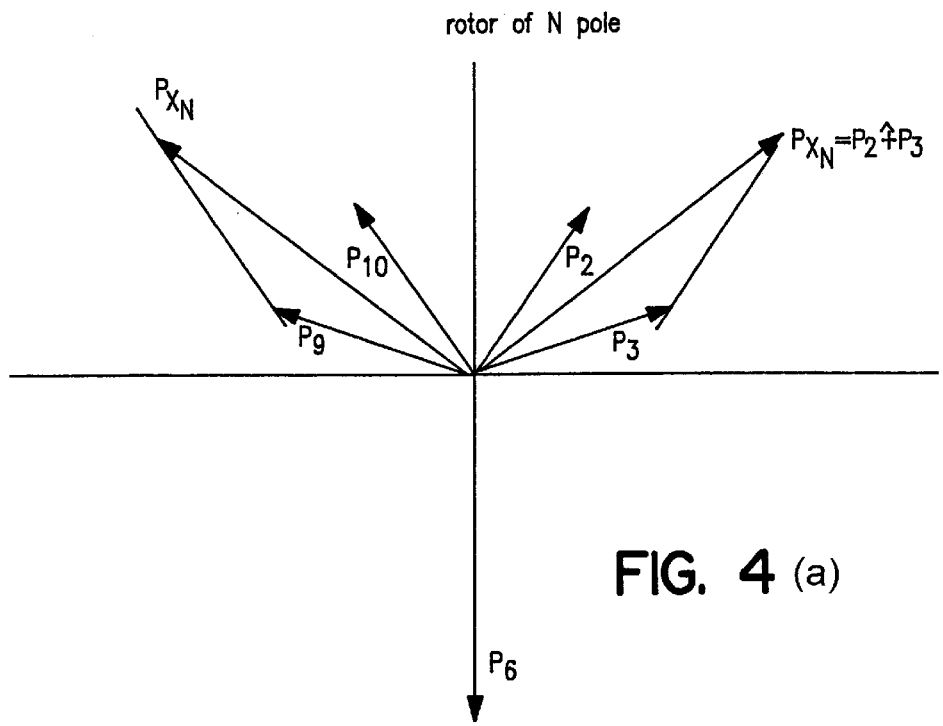
FIG. 4a and 4b are vector diagrams of a North Pole and South Pole of a rotor according to an embodiment of the present invention.
Figure 4:
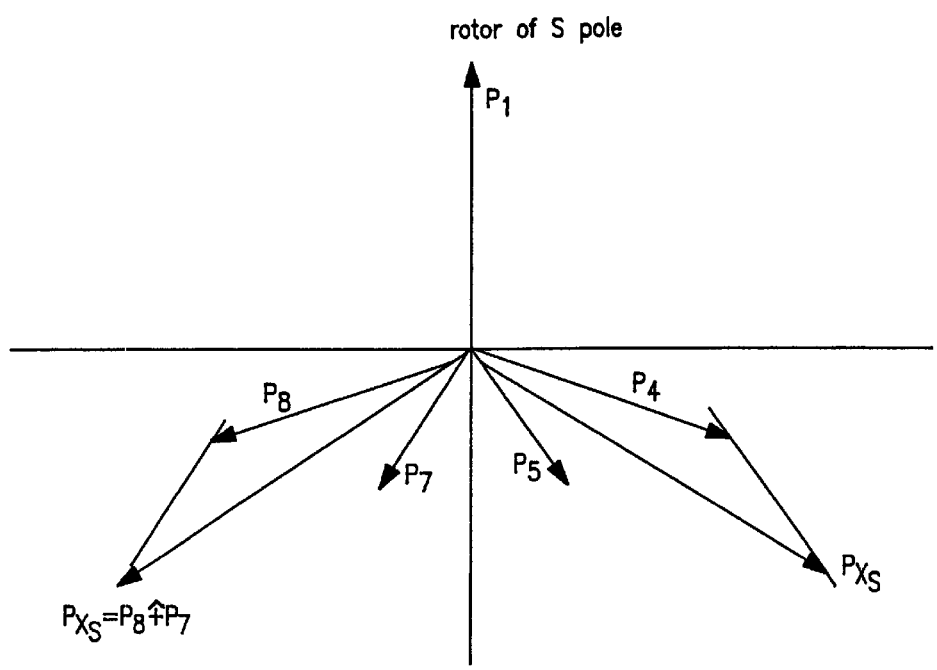

As shown in FIG. 4, radial stress exerted on the rotor caps is divided into three directions. The stress is evenly applied to the two rotor caps. The three directional components of the stress may less affect the manufacturing tolerance. Thereby, the step angle accuracy will increase and unwanted vibration will be reduced. This is because there are provided only three large distanced slots between the fixed magnetic poles. FIG. 6 shows the polarization of the fixed magnetic poles during a series of 20 consecutive steps. The full 20 steps perform one rotation of the rotary shaft 4. As apparent from FIG. 6, the number of N poles is identical to the number of S poles in the stepping motor at every position or step. This results in reduction of the hysteresis.

Figure 5:
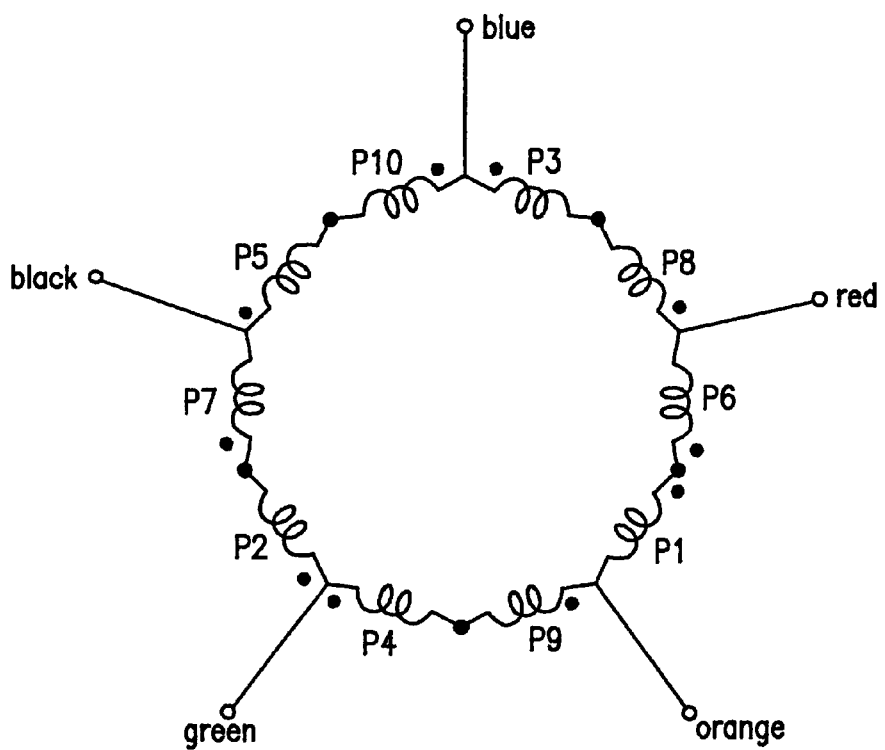
FIG. 5 is a wiring diagram according to an embodiment of the present invention.

The step-by-step rotating movement will now be described referring to FIGS. 5 and 6. FIG. 5 is a wiring diagram according to the embodiment of the present invention. The ten fixed magnetic poles are coupled to one another in a circular order of P3, P8, P6, P1, P9, P4, P2, P7, P5, and P10. Five, blue, red, orange, green, and black colored terminals are provided between P10 and P3, P8 and P6, P1 and P9, P4 and P2, and P7 and P5 respectively. FIG. 6 is a diagram showing the polarization of the fixed magnetic poles in a full step mode. The dots in FIG. 5 represent the direction of coil windings.

Each of the blue, red, orange, green, and black colored terminals is coupled to a two-throw switch which normally stays in the neutral mode and is turned to one position for connecting to a positive source and to the other position for connecting to a negative source, although the respective switching circuits are not shown in FIG. 5. Each switch is selectively connected to one of the three positions by a command signal from an unshown control unit. Accordingly, the ten magnetic poles are energized to have polarities as shown in FIG. 6 at each step. The switching action at the step produces the two polar states of the same number.

FIG. 7 is a diagram showing the polarization of the fixed magnetic poles at the steps in a half step mode.

As set forth above, the present invention with the foregoing arrangement allows the torque stiffness to be stable, the static torque to be equilibrated, and the step angle to be at high accuracy. In both the full and half step modes, the S and N poles of the same number are produced at each step of the movement. This will minimize abnormal vibration during the rotating movement.

As the specific teeth arrangements of the rotor and the stator are provided in a combination, the static torque acts in equilibrium and the step angle stays at high accuracy. In addition, the S and N poles become equal in the number in the full and half step modes, abnormal vibration during the rotating movement will be minimized.

What is claimed is:

1. A multi-phase hybrid type stepping motor including a rotor having a plurality of rotor teeth disposed about a perimeter thereof and a stator encircling said rotor, said stator comprising:

a first plurality of magnetic poles, each including a first predetermined number of teeth; and a second plurality of magnetic poles alternately disposed between said first plurality of magnetic poles, each including a second predetermined number of teeth greater than said first predetermined number of teeth.

2. A multi-phase hybrid type stepping motor including a rotor having a plurality of rotor teeth disposed about a perimeter thereof and a stator encircling said rotor, said stator comprising:

a first group of five magnetic poles, each including a first predetermined number of teeth; and a second group of five magnetic poles alternately disposed between said first group of five magnetic poles, each including a second predetermined number of teeth greater than said first predetermined number of teeth.

3. The multi-phase hybrid type stepping motor according to claim 2, wherein the first predetermined number of teeth is four and the second predetermined number of teeth is five.

4. The multi-phase hybrid type stepping motor according to claim 2, wherein:

said first predetermined number of teeth is n0 and said second predetermined number of teeth is n1; and a total number of teeth NS of said stator satisfies the following equation:

$$NS = 5 \times (n0 + n1).$$

5. The multi-phase hybrid type stepping motor according to claim 3, wherein:

said first predetermined number of teeth is n0 and said second predetermined number of teeth is n1;

said number of rotor teeth is NR; and the variables n0, n1 and NR satisfy the following equation:

$$NR - (n0 \times 5) - (n1 \times 5) = 5.$$

6. The multi-phase hybrid type stepping motor according to claim 2, wherein:

each of said first group of five magnetic poles has a coil wound thereon with said first group respectively designated as P1, P3, P5, P7, and P9;

each of said second group of five magnetic poles has a coil wound thereon with said second group respectively designated as P2, P4, P6, P8, and P10; and the respective coils of said first and second group of magnetic poles are coupled in a circular order of P3, P8, P6, P1, P9, P4, P2, P7, P5 and P10.

7. A multi-phase hybrid type stepping motor including a rotor having a plurality of rotor teeth of predetermined pitch disposed about a perimeter thereof and a stator encircling said rotor, said stator comprising:

a first plurality of magnetic poles, each including a first predetermined number of teeth having a pitch equal to the predetermined pitch of the rotor teeth; and a second plurality of magnetic poles alternately disposed between said first plurality of magnetic poles, each including a second predetermined number of teeth greater than said first predetermined number of teeth and having a pitch equal to the predetermined pitch of the rotor teeth.

8. A multi-phase hybrid type stepping motor comprising:

a rotor rotatably mounted on a rotary shaft and having an axial center;

a rotor magnet mounted to the axial center of the rotor;

a rotor cap mounted on an end of said rotor and connected to a first side of said rotor magnet, said rotor cap having a plurality of rotor teeth of predetermined pitch disposed about a perimeter thereof;

a stator encircling said rotor cap;

a first plurality of magnetic poles inwardly disposed from said stator, wherein each of said first plurality of magnetic poles includes a first predetermined number of teeth disposed on an inward end thereof and having a pitch equal to the pitch of the rotor teeth; and a second plurality of magnetic poles inwardly disposed from said stator and alternately disposed between said first plurality of magnetic poles such that each pole of said second plurality of magnetic poles is opposite from a pole of said first plurality of magnetic poles with respect to said rotor;

wherein each of said second plurality of magnetic poles includes a second predetermined number of teeth greater than said first predetermined number of teeth disposed on an inward end thereof, said second predetermined number of teeth having a pitch equal to the pitch of the rotor teeth.

9. The multi-phase hybrid type stepping motor according to claim 8, wherein the first predetermined number of teeth is four and the second predetermined number of teeth is five.

10. The multi-phase hybrid type stepping motor according to claim 8, wherein:

said first predetermined number of teeth is n0, said second predetermined number of teeth is n1, and said total number of teeth of said stator is NS; and the total number of teeth of said stator NS satisfies the following equation:

$$NS = 5 \times (n0 + n1).$$

11. The multi-phase hybrid type stepping motor according to claim 8, wherein the difference between the number of teeth of said rotor and the number of teeth of said stator is 3.

12. The multi-phase hybrid type stepping motor according to claim 8, wherein the difference between the number of teeth of said rotor and the number of teeth of said stator is 5.

13. The multi-phase hybrid type stepping motor according to claim 8, further comprising:

a second rotor cap mounted on said rotor and connected to a second side of said rotor magnet, said second rotor cap having a plurality of rotor teeth of predetermined pitch equal to the pitch of the rotor teeth of said rotor cap which is connected to the first side of said rotor magnet, wherein said second plurality of rotor teeth are disposed about a perimeter thereof.

14. The multi-phase hybrid type stepping motor according to claim 13, wherein the second rotor teeth are displaced from said first rotor teeth by ½ Tp, where Tp is the pitch of the first rotor teeth.

* * * * *